United States Patent [19]

Mowrer

[11] Patent Number: 4,695,618

[45] Date of Patent: Sep. 22, 1987

[54] SOLVENTLESS POLYURETHANE SPRAY COMPOSITIONS AND METHOD FOR APPLYING THEM

[75] Inventor: Norman R. Mowrer, La Habra, Calif.

[73] Assignee: Ameron, Inc., Monterey Park, Calif.

[21] Appl. No.: 867,337

[22] Filed: May 23, 1986

[51] Int. Cl.⁴ ............................................. C08L 75/04
[52] U.S. Cl. ........................................ 528/55; 528/56; 528/57; 528/58; 528/60; 528/61; 528/64; 528/65; 528/66; 528/75; 528/76; 528/77
[58] Field of Search .................... 528/55–57, 528/58, 60, 61, 64, 65, 66, 75, 76, 77, 79

[56] References Cited

U.S. PATENT DOCUMENTS

| | | | |
|---|---|---|---|
| 4,195,148 | 3/1980 | Hagen | 528/48 |
| 4,234,445 | 11/1980 | Hagen | 528/48 |
| 4,267,299 | 5/1981 | Oechsle | 528/59 |

*Primary Examiner*—Maurice J. Welsh
*Attorney, Agent, or Firm*—Christie, Parker & Hale

[57] ABSTRACT

A method for preparing polyurethane by spraying solventless, equal volume mixtures of:

(a) a liquid polyisocyanate; polyisocyanurate or isocyanate terminated quasi-prepolymer; and (b) a curing agent comprised of a blend of from about 0 to 15% of a polyamine having an equivalent weight from about 30 to about 200, about 10 to 20% of a low molecular weight glycol having an equivalent weight of from about 30 to 200, about 40 to 80% of a relatively high molecular weight polyol or polyamine having an equivalent weight of about 350 to 2000, and about 1 to 20% of a synthetic zeolite molecular sieve, wherein the average equivalent weight of (b) is from about 150 to 500.

21 Claims, No Drawings

SOLVENTLESS POLYURETHANE SPRAY COMPOSITIONS AND METHOD FOR APPLYING THEM

FIELD OF THE INVENTION

This invention pertains to two-component solventless spray compositions for producing polyurethane and poly(urea)urethane coatings, the products produced from these compositions, a process for producing such products, and methods for using them.

BACKGROUND OF THE INVENTION

Polyurethane coatings are well known and have gained commercial acceptance as protective and decorative coatings for metal, wood, concrete, foam, and plastics in the aircraft, construction, product-finishing, textile and maintenance/architectural coatings markets. The basic raw materials used to prepare these coatings generally comprise as essential components (a) an aliphatic or aromatic di-or-polyisocyanate and (b) a co-reactant or curative component bearing active hydrogen containing groups, i.e., hydroxyl or amine groups, or latent active hydrogen containing groups, e.g., oxazolidines or ketimines. For typical two-package coating systems, the co-reactant is usually a hydroxyl group containing oligomer chosen from the general classes of polyesters, polyethers, alkyd resins and acrylics. The co-reactant component is generally the vehicle for pigment (grinding) and may also contain other additives such as catalysts, plasticizers, bitumenous extenders, suspending agents, anti-skinning agents, surfactants, and rheological modifiers.

Both the isocyanate-containing component and the active hydrogen-containing co-reactant usually contain volatile organic solvents whose primary function is to lower viscosity thereby providing a consistency suitable for spray application with conventional air, airless and electrostatic spray equipment.

A growing emphasis on compliance with government environmental and health hazard regulations that limit both the type and amount of volatile organic compounds (VOC) has prompted coating manufacturers and end users to evaluate new coating technologies.

Prior art high solids and solventless polyurethane coatings have been developed which comply with solvent emission regulations. As used herein, a solventless polyurethane coating is one in which substantially all of the constituents remain in the applied coating.

The first solventless, urethane coatings were the "one shot" systems, so named because no prereaction of components is involved. Typical "one shot" systems consist of a pure isocyanate component, usually 4,4'-diphenylmethane diisocyanate (MDI), and a curative component comprised of a blend of active hydrogen containing co-reactants, for example polyether or polyester polyols and lower MW glycol, with fillers and catalyst. The components are usually combined at volumetric mix ratios of 1:1 to 4:1. Although coating systems of this type are sprayable without the use of a solvent, there are some disadvantages. One shot systems are moisture sensitive because they contain a very high percentage of unreacted diisocyanate, usually 26–31% by weight, and cannot be sprayed under humid conditions without blowing or foaming. Another major disadvantage of one shot spray systems is reflected in the low physical properties of the polyurethanes they produce. Important physical properties such as tensile and tear strength and abrasion resistance are inferior to those obtained by solvent containing systems.

Prior art two package, solventless polyurethane coating systems with superior physical properties have also been developed. These spray systems are generally based on an isocyanate-containing prepolymer component combined with a curative component comprised of a viscous, sometimes solid, polyamine whose viscosity has been reduced by addition of a non-volatile diluent or whose volume has been adjusted with "polyol" so that it can be combined with the isocyanate component at predetermined volumetric mix ratios.

U.S. Pat. No. 4,195,148 and U.S. Pat. No. 4,234,445 disclose solventless polyurethane coatings which use a non-reactive, non-volatile lactone viscosity modifier to dissolve viscous or solid prepolymer and curative components to reduce viscosity of the systems so that they may be applied using airless, plural-component spray equipment.

U.S. Pat. No. 4,267,299 also discloses sprayable, solventless polyurethane compositions which combine an isocyanate terminated prepolymer component (Part A) with a curative component (Part B). The curative component is a blend of highly reactive polyamine with a slower reacting, higher molecular weight (MW) polyol. Part B includes enough highly reactive polyamine to react with substantially all of the isocyanate groups in the Part A within 2 to 5 minutes. The higher MW polyol is present in relatively small amounts and functions as a "reactive filler" or bulking agent which allows the Part A and Part B to be combined in ratios of from 2:1 to 4:1.

The polyurethane produced from preferred embodiments of prepolymer-based, prior-art inventions (U.S. Pat. No. 4,195,148, U.S. Pat. No. 4,234,445 and U.S. Pat. No. 4,267,299) have superior physical properties such as tensile strength, tear strength, and abrasion resistance compared to one-shot, solventless coating systems. Moreover, such prepolymer-based solventless coating systems are generally less sensitive to moisture than one-shot solventless systems because pre-reaction of the isocyanate with polyol to form the prepolymer component results in less reactive isocyanate, typically 3 to 12% by weight.

There are some disadvantages associated with prior art, prepolymer based solventless polyurethane coatings. For optimum mixing, a ratio of 1:1 is desirable; preferred embodiments of the prior art have volumetric mix ratios of 3:1. A major disadvantage of preferred embodiments of prior-art, prepolymer-based, solventless, polyurethane coatings is that the components must be heated to 160° F.–200° F. to reduce viscosities for spray application. Heating, maintaining and applying components at 160°–200° F. requires additional equipment such as drum heaters to warm viscous materials to a pumpable viscosity, electrical induction heaters to further raise component temperatures and reduce viscosity, and the use of heated hoses to maintain temperature until the components enter the spray gun. Prior-art systems have fast gel times, typically 0.5 to 3 minutes at application temperatures of 160°– 200° F., and must be applied with an internal mix, plural-component spray gun such as the Binks 43-P. Internal mix spray guns of this type are connected to three spray hoses; one for each component and one for solvent flushing. The hoses increase the weight of the spray gun, make the gun awkward to use, and severely restrict the movement of the applicator in confined areas such as manholes or covered hopper cars. Accordingly, a solventless, polyurethane coating composition is needed which combines the ease of application at ambient temperatures and superior physical properties.

SUMMARY OF THE INVENTION

The two component, solventless spray composition for producing polyurethane and poly(urea)urethane coatings of the present invention includes substantially equal volumes of an isocyanate-containing component and a curative component. The isocyanate-containing component comprises a liquid polyisocyanate, polyisocyanurate or isocyanate-terminated prepolymer or quasi-prepolymer. The curative component is comprised of from about 0% to about 15% by weight of one or more polyamines (di-or-polyamines) or alkanolamines in an amount sufficient to react to form a thixotropic mixture about 15 seconds to about 2 minutes after being mixed with the isocyanate-containing component, from about 10% to about 20% by weight of one or more glycols having an equivalent weight in the range from about 30 to about 200, from about 40% to about 80% by weight of one or more high molecular weight polyols or polyamines having an equivalent weight in the range from about 300 to about 2000, and from about 1% to about 20% by weight of one or more additives to adsorb moisture or carbon dioxide.

The polyamines or alkanolamines preferably have an equivalent weight in the range from about 30 to about 200 and are present in an amount sufficient to form a coating which is substantially tack-free within about 5 minutes to about 60 minutes after being mixed with the isocyanate-containing component. In a specifically preferred embodiment, the polyamines or alkanolamines make up from about 2% to about 7% by weight of the curative component and are diethyl toluenediamine.

The curative component can also include one or more catalysts to promote the hydroxyl-isocyanate reaction in formation of a polyurethane or poly(urea)urethane. Preferably the two components have an isocyanate to active hydrogen equivalent ratio of from about 0.85 to about 1.15. When the components are blended with a pigment and/or other additives or fillers the blend preferably has an average equivalent weight of from about 150 to about 500. These optional pigments and/or other additives or filler are part of the curative component prior to blending.

The present invention also encompasses a method wherein the isocyanate-containing component and curative component are separately delivered to a manifold, preferably in a volumetric ration of 1:1. The components are then mixed with each other and sprayed through an atomizing nozzle onto a surface to produce a polyurethane or poly(urea)urethane coating. For spraying the mixture at ambient temperatures, around 70° F. to 100° F., the isocyanate-containing component and the curative component preferably have viscosities less than 1000 centipoise at these temperatures.

OBJECTS OF THE INVENTION

This invention provides solventless, polyurethane coating compositions which combine the ambient temperature ease of applying solventless, one-shot polyurethane coating systems with the lower moisture sensitivity and superior physical properties of the coatings produced from solventless, prepolymer-based polyurethane coating compositions.

Preferably, the coating system of this invention includes Parts A and B which are mixed substantially 1:1 by volume.

Preferably, Part B (the curative component) comprises essentially a major portion of a blend of high molecular weight polyol or polyamine and low molecular weight glycol, a minor portion of a highly reactive alkanolamine or polyamine, and an additive to adsorb moisture and $CO_2$. Preferably, Part B also produces a thixotropic mixture approximately 30 seconds after being combined with the Part A (the isocyanate-containing component). This thixotropic mixture can be spray-applied to thicknesses of from 20–250 mils on vertical surfaces without sagging even though it is applied at ambient temperature, and it is tack-free in 5–60 minutes.

In the preferred spraying method of this invention, the Part A and Part B components are pumped from separate containers into a manifold where they are mixed 1:1 by volume, and then delivered through a single "whip-hose" to a spray nozzle for application to the surface to be coated.

DETAILED DESCRIPTION OF THE INVENTION

This invention provides two-component, solventless polyurethane compositions which may be combined at substantially 1:1 by volume, and applied with commercially available, plural component, airless-spray equipment at ambient temperatures.

The Part A, or isocyanate-containing component, includes a liquid polyisocyanate, polyisocyanurate, or isocyanate-terminated prepolymer or quasi-prepolymer with a reactive isocyanate content of from about 12–25% by weight. Quasiprepolymers useful in this invention are materials made by reacting a polyurethane forming polyol or polyamine with an excess of a polyurethane forming aliphatic or aromatic polyisocyanate such as polymethylene polyphenyl isocyanate, 4,4'-diphenylmethane diisocyanate (MDI), and liquid carbodiimide or uretonimine modified MDI variants. Other useful isocyanates include: 3-isocyanatomethyl-3,5,5,-trimethylcyclohexyl isocyanate (IPDI); bis(4-isocyanatocyclohexyl)methane (Desmodur W); xylene diisocyanate (XDI); m-and-p-tetrametyl xylene diisocyanate (m-and-p-TXMDI); "dimeryl" diisocyanate (DDI); and adducts or trimers of hexamethylene diisocyanate with free monomeric isocyanate content less than 0.7% such as Desmodur N3200 and N3300. Toluene diisocyanate (TDI) adducts with free monomeric TDI content of less than 0.7% may also be employed.

The polyol or polyamines used to make the quasi-prepolymer are poly(alkylene ether) glycols, polyester glycols, polycaprolactone glycols, polycarbonate glycols, castor oils, polybutadiene glycols, polyetherthioether-glycols and the like of which the following are mentioned as non-limiting examples:

Polytetramethylene ether glycols, MW 650–2900
Polypropylene ether glycols, MW 400–4000
castor oil and castor oil derivatives, MW 300–1000
polycaprolactone glycols, MW 300–2000
polydiethylene adipate, MW 500–2000
hydroxyl-terminated Bisphenol A polyols, MW 400–1000
polycarbonate glycols, MW 500–2500
polybutylene and ethylene/butylene adipate, MW 500–2000
polyetherthioether glycols, MW 400–2000 hydroxyl functional acrylic polyols, MW 300–1000

The second component of the present invention is a Part B or curative component which is preferably comprised of:

(a) 0 to 15% by weight of a polyamine (di-or-polyamine) or an alkanolamine with an equivalent weight of 30 to 200;

(b) 10 to 20% by weight of a glycol having an equivalent weight of from 30 to 200;

(c) 40 to 80% by weight of a high molecular weight polyol or polyamine with equivalent weight of from 300–2000; and (d) 1 to 20% by weight of an additive to adsorb moisture or $CO_2$.

These are blended to have an average equivalent weight of from 150 to 500.

The curative component may also contain pigments or dyes, rheological additives, surfactants, UV stabilizers, and fillers such as silica or silica flour, barytes, talc, aluminum trihydrate, calcium carbonate and the like. Catalysts which promote the hydroxyl-isocyanate reaction in formation of a polyurethane are highly desirable constituents of the curative component. Catalysts well known in the art include such materials as dibutyltin dilaurate, stannous octoate, lead octoate, phenylmercuric proprionate, ferric acetylacetonate and organo-zinc compounds such as zinc octoate. The preferred catalyst is the composition Cotin 222 sold by Cosan Chemical Corporation. Cotin 222 is an organo-tin carboxylate containing negligible free acid and is described in detail in U.S. Pat. No. 3,661,887, which is incorporated herein by reference. Coscat 83, a proprietary organo-metallic composition based on bismuth and sold by Cosan Chemical Corp., can also be used. Catalysts are particularly desirable when the polyurethane coatings are applied in the presence of moisture. The catalyst promotes the hydroxyl-isocyanate reaction in favor of the reaction of isocyanate with water so that the superior physical properties of the coating are maintained.

Catalysts also act to accelerate the cure time of the coating and allow application to vertical surfaces without sagging. In fact, if enough catalyst is added to the curative component of this invention, the percent by weight of polyamine or alkanolamine used in the curative component can be reduced to zero. However, this does not result in the most preferable coating because the physical properties of the coating suffer somewhat when the percent by weight of polyamine or alkanolamine is reduceed below two.

The following are non-limiting illustrative examples of essential constituents of the curative or Part B component:

Polyamines or alkanolamines with equivalent weight of 30 to 200 include triethanolamine, 1,6-hexanediamine, Quadrol (BASF), methylene dianiline, menthanediamine, isophorone diamine, 1,4-diamino cyclohexane, Lauramin C-260 (BASF), PACM-20 (Dupont), Jeffamine T400 (Texaco), methylene-bis-2,6 diisopropylaniline ("MDPA": from Ethyl or "MDIPA": from Lonza), diethyl toluenediamine (DETDA sold by Ethyl and Lonza), t-butylbenzenediamine, methylene-bis-2,-diethylaniline, 2,2-diaminodiphenyl disulphide, 1,3-propanediol di-p-aminobenzoate, bis(2-aminophenylthio)ethane, and methylene bis N-methylanthranilate. The type of polyamine or alkanolamine selected depends on the isocyanate-containing component used to form the polyurethane. If the isocyanate component is based on aliphatic isocyanate, a very reactive aliphatic or cyloaliphatic polyamine such as 1,6-hexanediamine, PACM-20 sold by Dupont, isophorone diamine or menthanediamine is used. If the isocyanate component is based on aromatic diethyltoluenediamine may be used. The specific amount, if any, of polyamine used reacts to form a thixotropic mixture approximately 15 seconds to 2 minutes after mixing with the isocyanate containing component, preferably this amount ranges from 2 to 7% by weight of the curative component.

The second preferred constituent of the curative component is a glycol or polyol having an equivalent weight of from 30 to 200. Useful glycols include ethylene glycol, trimethylol-propane, 1,3-butylene glycol, 1,4-butylene glycol, 2,ethyl-1,3-hexanediol, 1,5-pentanediol, 1,6-hexanediol, dipropylene glycol, glycerol, neopentylglycol, thiodiglycol, bisphenol A-and bisphenol F-based glycols, dihydroxyethylethers of resorcinol and hydroquinone, and low molecular weight polyalkylene ether glycols. The presence of the glycol in the curative component helps contribute to the low temperature sprayability of the spray composition.

The third preferred constituent of the curative component is a relatively high molecular weight polyor or polyamine having an equivalent weight of from 300–2000. Particularly useful polyols are polytetramethylene ether glycol, poly(ethylene oxide)-terminated polypropylene ether glycols, castor oil, polypropylene ether glycols, polyethylene-butylene adipate glycols, polybutadiene glycols, polyetherthioether glycols and oligomeric diaminobenzoates such as Polyamine-1000 sold by Polaroid.

The fourth preferred constituent of the curative component is a non-reactive additive which reduces blistering and blowing or foaming during application of the solventless polyurethane coating system in humid weather or on damp substrates by combining with or adsorbing moisture and/or carbon dioxide. Suitable moisture scavenging additives are calcium sulfate, calcium oxide and synthetic zeolite "molecular sieves". The amount of moisture scavenging additive used is increased according to the expected humidity at the point where the coating is to be applied.

Preferably, the low molecular weight polyamine, low molecular weight glycol, high molecular weight polyol, and moisture-adsorbing additive are blended with pigment, catalyst and other additives in Part B (curative) to an average equivalent weight of from 150 to 500. The equivalent weight of the curative blend depends on the isocyanate content of the Part A or isocyanate containing component, and is calculated to give an isocyanate to active hydrogen equivalent ratio of from 0.85 to 1.15 based on a 1:1 volumetric mixture of Part A to Part B.

The isocyanate and curative components typically have viscosities of less than 1000 centipoise at 70° F. and are pumped directly from drums in two separate 3000 psi, ¼ inch ID paint hoses to 1:1 proportioning cylinders mounted below a 30:1, air-regulated Graco Bulldog pump which delivers equal volumes of both components to a manifold fitted with static mixer. The components are thoroughly mixed as they pass through the manifold and static mixer into a single, 3/16 inch ID "whip-hose" and are delivered to a standard, airless spray gun such as a Graco Silver. The mixed components have sufficient potlife to permit the use of 25 to 50 feet of whiphose and "triggering" of the spray gun to the off position for 30–45 seconds. The whiphose and standard airless spray gun is less cumbersome than the three hoses and plural-component, internal-mix spray gun used to spray prepolymer-based polyurethane coating systems, and is easier to use in confined or restricted-access areas. Triggering of the spray gun off during the coating operation often results in less overspray and more economical use of material as the gun is moved from a sprayed area to a non-sprayed area.

The mixed composition is atomized at the spray gun tip and deposited on the surface to be coated at thicknesses of from 15 to 30 mils per pass. The thixotropic mixture permits multiple passes of the spray gun and continuous film build up to 250 mils without sagging. The applied coating is tack-free in from 5 to 60 minutes and is ready for service within 4 to 24 hours, depending on the application.

The coating compositions of the present invention exhibit excellent adhesion by themselves to many substrates including metal, wood and concrete. A primer or adhesive is not required for many applications, if the substrate has been properly prepared and cleaned. Coating compositions of the present invention exhibit excellent adhesion to ferrous metal substrates which have been sandblasted to a near-white metal finish (SSPC-SP-10) with 2-3 mil profile and concrete that has been sweepblasted or acid-etched. When there is a long period of time between blasting the metal and coating or where optimum adhesion and corrosion protection are desired, primers such as Amerthane ® 135, Amercoat ® 2183, Amercoat ® 460, Amercoat ® 66, and Amerlock ® 400 should be used. Concrete with rough surfaces or cracks may be filled with a cementitious coating such as Nu-Klad ® 965 or an epoxy-surfacer such as Nu-Klad ® 114 and then sealed with a primer such as Amerthane ® 135.

The solventless polyurethane compositions of this invention form polyurethane coatings useful in many applicaitons. The isocyanate and curative components are selected for a particular application based on the physical characteristics and chemical resistance characteristics of the polyurethane they produce. For example, coating systems based on polytetramethylene ether glycol are well suited for applications which require good resistance to abrasive wear such as ore-handling equipment, and hopper cars. Coating systems based on castor oil provide good hydrolytic stability and chemical resistance, such as for wastewater treatment ponds and chemical or crude oil storage tanks.

The spray system of this invention has major advantages compared to high-solids, solvent-containing polyurethane coating systems; solventless, one shot polyurethane coating systems; and prior-art solventless, prepolymer-based poly-urethane coating systems.

The major advantages compared to solvent-containing systems are:

1. There are no volatile solvents which present health or explosion hazards, and there are no limitations arising from environmental regulations on volatile organic compound emissions.

2. The spray system of the present invention can, with multiple passes, apply high coating thicknesses of from 20 to 250 mils without sagging compared to 10 to 40 mils for solvent-containing systems.

3. Tack-free time and curing are short, which allows for quick recoating and reduces the time required for the applied coating to be handled or placed in service.

4. The solventless system of the present invention requires less volume to apply the same dry film thickness than a solvent-containing system; there is less material to store, handle, and apply.

5. Problems associated with solvent-containing systems such as shrinkage, blistering, holidays and premature deadhesion caused by solvent retained in the applied coating are significantly reduced.

The major advantages of the present invention compared to solventless, one-shot, polyurethane coating systems are reduced sensitivity to moisture-generated foaming, and improved physical properties such as higher tensile and tear strength.

Spray compositions of the present invention have equivalent physical properties such as tensile and tear strength compared to prior-art, solventless, prepolymer-based polyurethane systems but have the following major advantages:

1. Spray compositions of the present invention are low viscosity liquids that can be applied at 70° F.–100° F. The need for expensive, additional equipment required to preheat, maintain and apply prepolymer-based coating systems is eliminated.

2. Coating systems of the present invention are applied with a single paint hose and standard, airless spray gun, which is easier to use than the internal-mix, plural-component guns used to apply prior-art, prepolymer-based coating systems.

3. The compositions of the present invention have sufficient pot-life to allow triggering of the spray gun for 30–45 seconds, which reduces overspray and consumes less material when coating complicated shapes.

4. The components of the present invention are combined 1:1 by volume, which is desirable for optimum mixing, and is more forgiving to off-ratio conditions which frequently occur during field application using plural component, airless spray equipment.

5. Despite being applied at 70° F.–100° F. and requiring 5 to 60 minutes for the coating to be tack-free, a continuous film of up to 250 mils in thickness can be applied without sagging so that spray compositions of the present invention have equivalent physical properties compared to prior-art, solventless, prepolymer-based polyurethane systems applied at higher temperatures and having faster cure times.

The following examples illustrate, but do not limit, the present invention.

EXAMPLE I

Preparation of An MDI/polypropylene Ether Glycol Quasi-Prepolymer (Part A)

7505.0 grams (52.3 eqs) of carbodiimide modified MDI, Isonate 143L sold by Upjohn, was charged to a resin flask equipped with an agitator, thermometer, $N_2$ inlet, condenser, and an addition funnel. 2450.0 grams (4.9 eqs) of predried Niax Polyol PPG 1025 (%$H_2O$ content less than 0.05%) was charged to the addition funnel and added to the Isonate 143L with continuous agitation and nitrogen blanketing. The exotherm was kept below 50° C. by adjusting the addition rate. After the addition of Niax Polyol PPG 1025 was complete, the temperature was raised to 70° C. and held for one hour. Table I shows the results.

Preparation of the Curative Blend (Part B)

The constituents listed below were charged to a resin flask equipped as described in the prepolymer preparation.

| Ingredients | Parts by Weight (grams) | Equivalents |
| --- | --- | --- |
| Castor DB Oil, Caschem | 4821.0 | 14.1 |
| 2-ethyl-1,3 hexanediol | 1474.0 | 20.2 |
| DETDA, Ethyl | 636.0 | 7.1 |
| Niax Polyol PPG 1025, Union Carbide | 1373.0 | 2.8 |
| Baylith L Paste, Mobay | 1264.0 | 1.8 |
| PDI 47055B, PDI Inc. | 406.0 | 0.2 |
| Dibutyltindilaurate | 3.0 | — |

The ingredients were heated at 100° C. under vacuum until the moisture content was less than 0.08% by weight. Table I shows the results.

EXAMPLE II

Preparation of An MDI/Polytetramethylene Ether Glycol Quasi-Prepolymer (Part A)

The same procedure used to prepare Part A in Example I was used except that the components were 11,125.0 grams (82.1 eqs) Rubinate XI-208 from Rubicon and 5105.0 grams (10.0 eqs) Terrathane 1000 from Dupont. Table I shows the results.

Preparation of Curative Blend (Part B)

The same procedure used to prepare the Part B of Example I was used with the components listed below.

| Ingredients | Parts by Weight (grams) | Equivalents |
| --- | --- | --- |
| Terrathane 1000, Dupont | 964.8 | 1.890 |
| Voranol XAS1077.02, Dow | 688.9 | 0.630 |
| 1,4 butanediol | 255.5 | 5.670 |
| DETDA, Ethyl | 157.5 | 1.770 |
| PDI 47055-B, PDI | 86.5 | 0.035 |
| Coscat 83, Cosan | 1.3 | — |
| Baylith L Powder, Mobay | 38.8 | — |

The Part A and Part B from each example were combined 1:1 by volume and sprayed using the equipment previously described. Table I shows the results.

TABLE I

| | Example I | Example II |
| --- | --- | --- |
| Part A | | |
| % NCO | 19.7 | 18.7 |
| Visc @ 75° F., cP | 600 | 900 |
| Part B | | |
| % H$_2$O, KF | 0.08 | 0.09 |
| Visc @ 75° F., cP | 600 | 800 |

Physical Properties of Spray-Applied, 1:1 Volume Mix Aged 14 Days at 75° F./50% R.H.

| | | |
| --- | --- | --- |
| Hardness | 60 Shore D | 90 Shore A |
| Tensile, psi | 3500 | 3000 |
| Elongation, % | 120 | 320 |
| Tear, DieC | 500 | 400 |
| Resilience, Bashore | 30 | 27 |
| Abrasion Resistance, Wt. loss, mg. (H-10 Wheel/1000 g/1000r) | 50 | 40 |
| Elcometer Adhesion, psi (unprimed cold-rolled steel) | 1800 | 1500 |

Numerous variations can be made in the practice of the invention, by selecting particular polyisocyanate, polyisocyanurate or isocyanate-terminated prepolymers or quasiprepolymers and combinations thereof, and by selecting particular curative components comprised of particular polyamines or alkanolamines, particular glycols, particular high molecular weight polyols or polyamines, particular moisture-adsorbing additives, particular catalysts and any other desired additives or fillers, to establish the specific physical and chemical characteristics and economics of use appropriate for the surface to be coated.

I claim:

1. A two-component solventless spray composition for producing polyurethane and poly(urea)urethane coatings comprised of substantially equal volumes of:
   an isocyanate-containing component comprised of a liquid polyisocyanate, polyisocyanurate or isocyanate-terminated prepolymer or quasi-prepolymer; and
   a curative component comprised of from about 0% to about 15% by weight of one or more polyamines or alkanolamines in an amount sufficient to react to form a thixotropic mixture about 15 seconds to about 2 minutes after being mixed with the isocyanate-containing component, from about 10% to about 20% by weight of one or more glycols having an equivalent weight in the range from about 30 to about 200, from about 40% to about 80% by weight of one or more high molecular weight polyols or polyamines having an equivalent weight in the range from about 300 to about 2000, and at least about 1% by weight of one or more additives to adsorb moisture or carbon dioxide.

2. A composition as set forth in claim 1 wherein the polyamines or alkanolamines have an equivalent weight in the range from about 30 to about 200.

3. A composition as set forth in claim 1 wherein the curative component is also comprised of one or more catalysts to promote the hydroxyl-isocyanate reaction in formation of a polyurethane or poly(urea)urethane.

4. A composition as set forth in claim 1 wherein the additives to adsorb moisture are selected from the group consisting of calcium sulfate, calcium oxide or synthetic zeolite molecular sieves.

5. A composition as set forth in claim 3 wherein the catalysts are selected from the group consisting of dibutyltin dilaurate, stannous octoate, lead octoate, phenylmercuric propionate, ferric acetylacetonate, organo-tin carboxylates, organo-bismuth compounds or organo-zinc compounds such as zinc octoate.

6. A composition as set forth in either of claims 1 or 3 wherein the components when blended have an average equivalent weight of from about 150 to about 500.

7. A composition as set forth in either of claims 1 or 2 wherein the components have an isocyanate to active hydrogen equivalent ratio of from about 0.85 to about 1.15.

8. A composition as set forth in claim 1 wherein each component has a viscosity less than 1000 centipoise at 70° F.

9. A composition as set forth in claim 1 wherein the one or more polyamines or alkanolamines make up from about 2% to about 7% by weight of the curative component.

10. A composition as set forth in claim 1 wherein the one or more polyamines or alkanolamines are diethyl toluenediamine.

11. A composition as set forth in claim 1 wherein the isocyanate-containing component is based on aliphatic isocyanate and the polyamine or alkanolamine is a very reactive aliphatic or cyloaliphatic polyamine.

12. A composition as set forth in claim 1 wherein the isocyanate-containing component is based on aromatic diisocyanate and the polyamine or alkanolamine is an aromatic diamine.

13. A composition as set forth in claim 1 wherein the one or more additives to adsorb moisture or carbon dioxide make up from about 1% to about 20% by weight of the curative component.

14. A two-component solventless spray composition for producing polyurethane and poly(urea)urethane coatings comprised of:
   an isocyanate-containing component comprised of a liquid polyisocyanate, polyisocyanurate or isocyanate-terminated prepolymer or quasi-prepolymer; and
   a curative component comprised of from about 0% to about 15% by weight of one or more polyamines or alkanolamines in an amount sufficient to form a coating which is substantially tack-free within about 5 minutes to about 60 minutes after being mixed with the isocyanate-containing component, from about 10% to about 20% by weight of one or more glycols having an equivalent weight in the range from about 30 to about 200, from about 40% to about 80% be weight of one or more high molecular weight polyols or polyamines having an equivalent weight in the range from about 300 to about 2000, and from about 1% to about 20% by weight of one or more additives to adsorb moisture or carbon dioxide.

15. A two-component solventless spray composition for producing polyurethane and poly(urea)urethane coatings comprised of:
   an isocyanate-containing component comprised of a liquid polyisocyanate, polyisocyanurate or isocyanate-terminated prepolymer or quasi-prepolymer; and
   a curative component comprised of from about 2% to about 7% by weight of one or more polyamines or alkanolamines having an equivalent weight in the range from about 30 to about 200, from about 10% to about 20% by weight of one or more glycols having an equivalent weight in the range from about 30 to about 200, from about 40% to about 80% by weight of one or more high molecular weight polyols or polyamines having an equivalent weight in the range from about 300 to about 2000, and from about 1% to about 20% by weight of one or more additives to adsorb moisture or carbon dioxide.

16. A method for the solventless spray application of a polyurethane or poly(urea)urethane coating, comprising the steps of:
   delivering to a manifold an isocyanate-containing component comprised of a liquid polyisocyanate, polyisocyanurate or isocyanate-terminated prepolymer or quasi-prepolymer;
   delivering to said manifold a curative component comprised of from about 0% to about 15% by weight of one or more polyamines or alkanolamines having an equivalent weight in the range from about 30 to about 200, from about 10% to about 20% by weight of one or more glycols having an equivalent weight in the range from about 30 to about 200, from about 40% to about 80% by weight of one or more high molecular weight polyols or polyamines having an equivalent weight in the range from about 300 to about 2000, and from about 1% to about 20% by weight of one or more additives to adsorb moisture or carbon dioxide;
   mixing the isocyanate-containing component and the curative component with each other; and
   spraying the resulting mixture through an atomizing nozzle onto a surface to produce a polyurethane or poly(urea)urethane coating.

17. A method as set fourth in claim 16 wherein the isocyanate-containing component and the curative component are delivered to the manifold in a volumetric ratio of 1:1.

18. A method as set forth in claim 16 wherein the average equivalent weight of the resulting mixture is in the range of from about 150 to about 500.

19. A method as set forth in claim 16 wherein the isocyanate-containing component and the curative component each have viscosities less than 1000 centipoise at ambient temperatures.

20. A method as set forth in claim 16 wherein the one or more additives to adsorb moisture or carbon dioxide make up from about 2% to about 8% by weight of the curative component.

21. The product of any of the methods set forth in any one of claims 16–20 inclusive.

* * * * *

UNITED STATES PATENT AND TRADEMARK OFFICE
CERTIFICATE OF CORRECTION

PATENT NO. : 4,695,618

DATED : September 22, 1987

INVENTOR(S) : Norman R. Mowrer

It is certified that error appears in the above-identified patent and that said Letters Patent is hereby corrected as shown below:

Column 1, line 31, change "bitumenous" to --bituminous--.

Column 3, line 52, change "ration" to -- ratio --.

Column 4, line 35, change "Quasiprepolymers" to -- Quasi-prepolymers --.

Column 5, line 49, change "reduceed" to -- reduced --.

Column 6, line 4, after "aromatic" insert -- diisocynate, aromatic diamines such as methylenedianiline, and --.

Column 6, line 23, change "polyor" to -- polyol --.

Column 6, line 66, change "whiphose" to -- whip hose --.

Column 7, line 36, change "applicaitons" to -- applications --.

Column 8, line 3, change "deadhesion" to -- de-adhesion --.

Column 11, line 29, after "80%" change "be" to -- by --.

Column 12, line 32, change "fourth" to -- forth --.

Signed and Sealed this

Nineteenth Day of July, 1988

Attest:

DONALD J. QUIGG

Attesting Officer

Commissioner of Patents and Trademarks